July 7, 1936.  C. B. KRAUSE  2,046,784
APPARATUS FOR PREPARING FOODS
Filed Nov. 22, 1933   2 Sheets-Sheet 1

INVENTOR:
CONRAD B. KRAUSE
ATTORNEYS

July 7, 1936.　　C. B. KRAUSE　　2,046,784
APPARATUS FOR PREPARING FOODS
Filed Nov. 22, 1933　　2 Sheets-Sheet 2

INVENTOR:
CONRAD B. KRAUSE
Kwis Hudson & Kent
ATTORNEYS

Patented July 7, 1936

2,046,784

UNITED STATES PATENT OFFICE 2,046,784

APPARATUS FOR PREPARING FOODS

Conrad B. Krause, Cleveland, Ohio

Application November 22, 1933, Serial No. 699,111

17 Claims. (Cl. 219—43)

This invention relates to apparatus for preparing foods, and more particularly to machines of this type embodying means for operating a plurality of food preparing tools or implements.

An object of this invention is to provide a food preparing machine of the type embodying agitating means, including a bowl, and also having novel means for releasably retaining the bowl in the desired position.

Another object of this invention is to provide a machine, of the type referred to, having a tool-carrying head which is pivoted for swinging the tool into a desired operative position, and wherein novel means is provided for locking the tool-carrying head in the desired tool operating position.

Still another object of my invention is to provide a food preparing machine, of the type mentioned, having a pivoted tool-carrying head and also embodying hold-down means adapted to co-operate with the mixing bowl for retaining the latter in a desired position when the tool-carrying head is swung to the tool operating position.

Yet another object of my invention is to provide a multiple operation food preparing machine embodying a novel and simplified arrangement of gear mechanism.

A further object of this invention is to provide a food preparing machine, of the type having a mixing bowl, and which embodies novel electric heating means for supplying heat to the bowl.

It is also an object of my invention to provide a novel form of liquid-conductor electric heater.

Other objects and advantages of my invention will be apparent from the following description, when taken in conjunction with the accompanying sheets of drawings, wherein Fig. 1 is a top plan view of a food preparing machine embodying my invention, but with portions of the tool-carrying head broken away to show the gearing arrangement.

Figure 1:
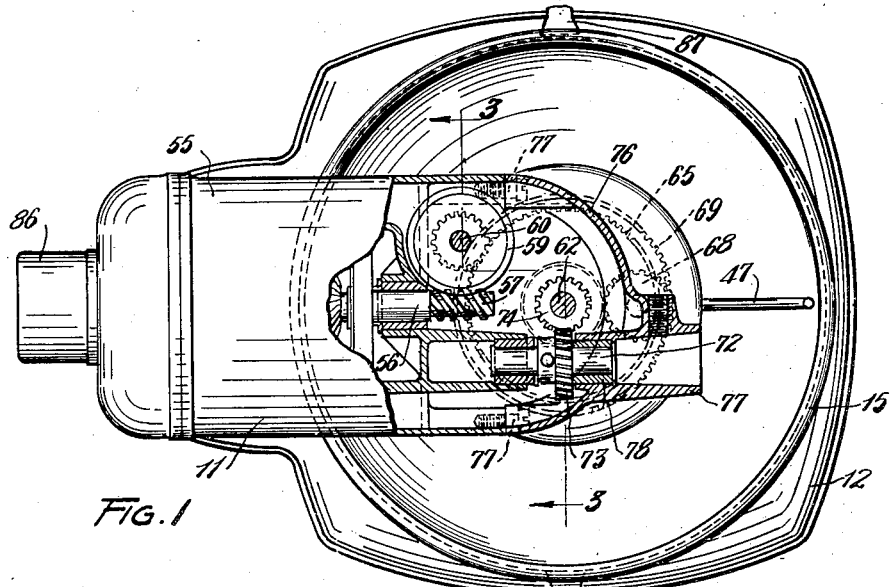

Detailed reference will now be made to the accompanying drawings which, as indicated above, illustrate an improved food preparing machine of the type embodying means for operating a multiplicity of food preparing tools or implements. While I have illustrated in the drawings what I now regard to be the preferred form of my improved food preparing machine, it will be understood, of course, that the invention may be embodied in various constructions other than the particular form of apparatus herein illustrated.

Figure 2:
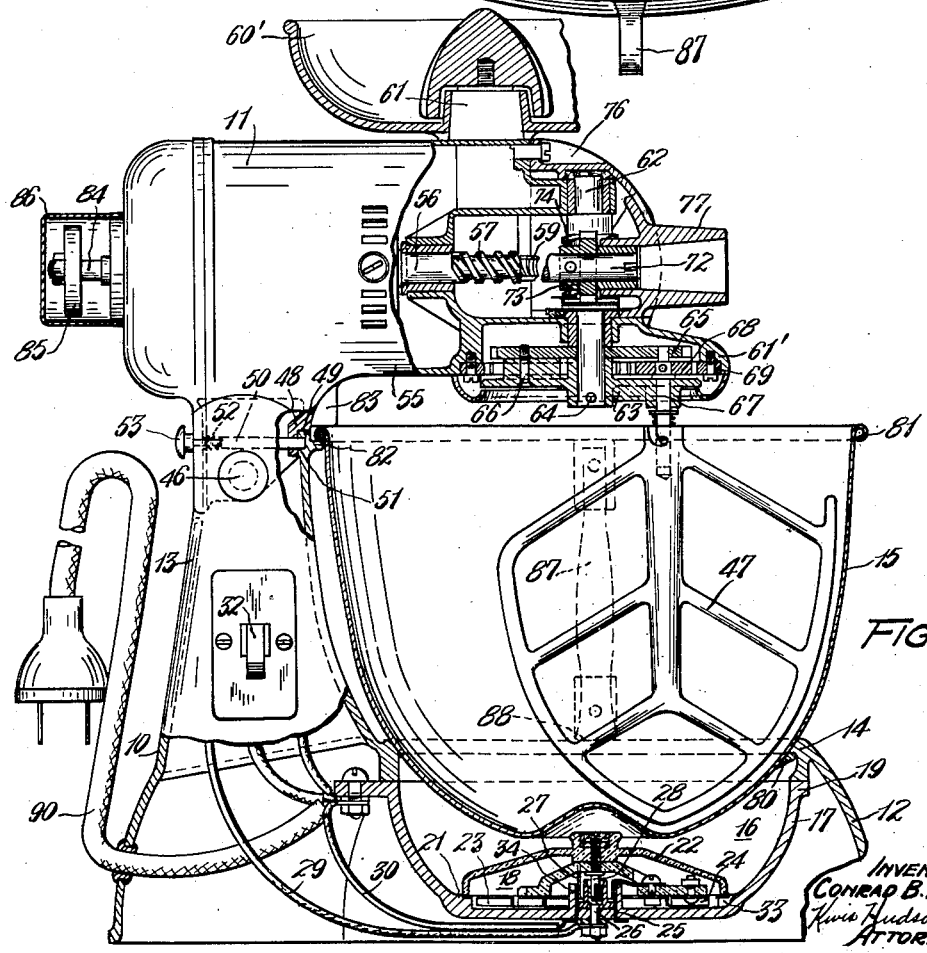
Fig. 2 is a side elevational view of my improved food preparing machine, with portions of the structure broken away to more clearly illustrate the various features of construction.
Figure 3:
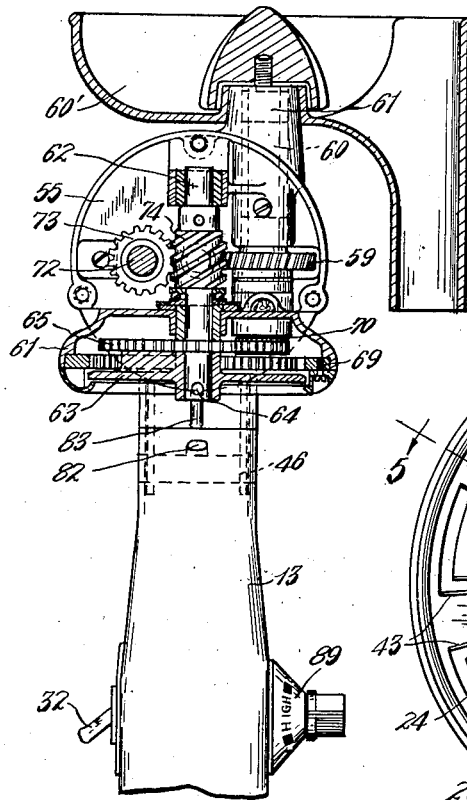
Fig. 3 is a partial sectional elevation taken substantially as indicated by line 3—3 of Fig. 1.

In general, my improved food preparing machine comprises a frame or supporting structure 10, and a tool-carrying and operating head or structure 11 which is operatively arranged on the frame or supporting structure 10. The frame may be constructed of suitable material, such as cast metal, and, as shown in Fig. 2 of the drawings, is preferably constructed with a platform-like base portion 12 upon which the machine stands, and with a pedestal-like upright portion 13 on which the tool-carrying head 11 is supported.

The base and pedestal portions 12 and 13 are of hollow construction so as to reduce the weight and cost of the machine and also to provide space for certain electrical apparatus embodied in the machine. The base portion 12 of the frame is constructed with an opening on the upper side thereof leading into the hollow interior of such base portion, and that part of the base portion, in this instance the rim 14, extending around such opening provides a support for the mixing bowl 15. An electric heater 16 is embodied in the hollow base portion 12 for supplying heat to the mixing bowl when the latter is in position on the support 14 for the mixing or agitating operation.

The electric heater 16 is of the liquid-conductor type and, according to my invention, comprises a dish-like container 17 which is supported in the base of the frame structure beneath the mixing bowl 15, and an electric heater element 18 removably mounted in the dish-like container. The dish-like container 17 may be formed of vitreous or other non-conducting material, and may be supported in the base portion with the upper edge or rim 19 of the container clamped or otherwise held in substantially fluid-tight engagement with the under side of the bowl supporting portion or rim 14. The bowl 15 and the bowl supporting portion 14 are preferably so designed that when the bowl is supported on the base portion, as illustrated in Fig. 2 of the drawings, the bowl substantially closes the opening into the base portion so that a heating fluid, such as steam or vapor generated by the electric heater element 18, will be confined and such steam or vapor coming in contact with the bottom of the bowl will heat the contents thereof.

As mentioned above, the electric heater is of the liquid-conductor type and by that I mean an electric heater of the type having spaced electrodes adapted to be connected in circuit by a vaporizable fluid, such as water, coming into contact with and connecting the electrodes. In this instance the dish-like container 17 is provided with a recess in the bottom wall thereof and with a shoulder 21 extending around such recess, and the electric heater element 18 is provided with an insulating body 22, resembling an inverted saucer, which is supported at its rim on the shoulder 21 with the spaced electrodes 23 and 24 of the heater element extending into the recess.

The container 17 is also provided with a pair of terminal elements 25 and 26 which are preferably arranged to extend through the bottom wall and into the container to be releasably engaged by similar contact elements 27 and 28 of the electric heater element. When the electric heater element 18 is placed in the container 17 in the position shown in Fig. 2, the contacts 27 and 28 engage the contacts 25 and 26 to thereby connect electrodes 23 and 24 with the electric conductors 29 and 30. When in this position, the electric heater element is supported on the annular shoulder 21 with the electrodes extending downwardly into the recess of the bottom wall of the container. When it is desired to supply heat to the mixing bowl, a quantity of water is poured into the container 17, after which the mixing bowl is placed on the support, and electric current is then supplied to the electrodes by closing the switch 32. The flow of current through the body of water heats the same and generates steam in the chamber below the mixing bowl which steam, coming in contact with the wall of the mixing bowl, causes the contents thereof to be heated. To readily allow the water to enter the recess of the container while the heater element is in place, the annular shoulder 21 may be provided with a plurality of interruptions, in the form of grooves or recesses 33.

Figure 4:
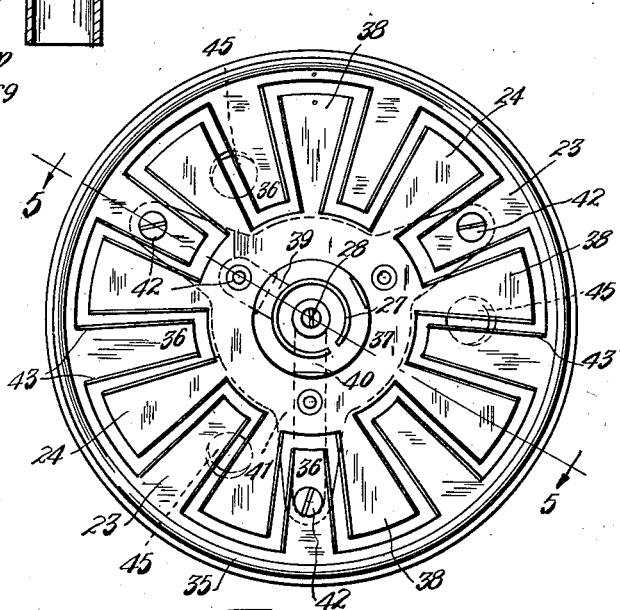
Fig. 4 is a bottom plan view of the electric heater element, showing the same detached from the machine.
Figure 5:
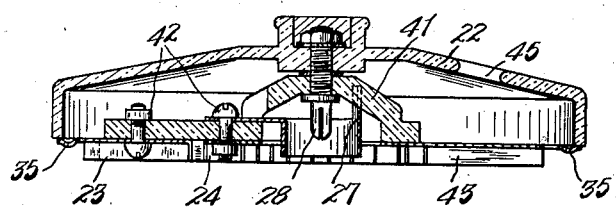
Fig. 5 is a transverse sectional view of the electric heater element, taken as indicated by the line 5—5 of Fig. 4.

While various forms of electric heaters of the liquid-conductor type may be employed for supplying heat to the mixing bowl, I have found that the electric heater element herein illustrated is of very compact construction and very efficient in operation. This heater element, as shown in Figs. 4 and 5 of the drawings, is constructed with the electrodes 23 and 24 on the under side thereof so that when the heater element is in position in the container 17 the electrodes and all electrical connections thereto will be entirely shielded by the saucer-like body 22, thereby preventing a housewife, or other person operating the mixing machine, from being injured by accidental contact with charged parts of the heater. Moreover, as explained above, the heating element is detachable and readily removable from the container 17 so that this element can be washed from time to time to maintain the electrodes in a clean and efficient condition and, when the heater element is thus removed, it is entirely disconnected from the current supplying connections. The terminal contacts 25 and 26 are shielded by the boss 34 in which they are disposed so that, during such time as the heater element 18 is removed from the container, these contacts cannot be touched by the operator.

Referring now to the particular form of the electrodes of the heater element, it will be seen from Figs. 4 and 5 of the drawings that the electrodes are constructed in the form of sheet metal stampings. Although the electrodes could be formed of other material than sheet metal, I prefer the latter material because of the economies involved in forming the electrodes by simple stamping operations. The electrode 23 is constructed with an annular rim portion 35 and with circumferentially spaced substantially radially disposed fingers 36 extending inwardly from the rim. The electrode 24 is provided with a ring portion 37, of relatively small diameter as compared with the rim portion 35 of the electrode 23, and with circumferentially spaced substantially radially extending fingers 38 extending outwardly from the ring portion. As shown in Fig. 4, the electrodes 23 and 24 are arranged with the radiating fingers 36 and 38 disposed in spaced interfitting relation. The terminal contact elements 27 and 28 are mounted on the heater body 22 substantially centrally thereof so as to be accessible through the opening of the ring portion 37 of the electrode 24. The terminal contact 27 may be electrically connected with the electrode 24 by means of the conducting strip 39, and the terminal contact 28 may be connected with the electrode 23 through the conducting strip 40. For supporting and correctly positioning the electrodes on the heater body 22 I may provide an insulating spider 41 which may be connected to the body by means of the terminal contact element 28 and to which the electrodes 23 and 24 may be connected by means of suitable screws 42.

To increase the efficiency of the heater element I provide each of the fingers 36 and 38 with depending integral flanges 43 at the edges thereof, which flanges materially increase the opposed surface area of the electrodes so that the water will be subjected to a more rapid vaporizing action. When the heater element is in place in the container 17 the flanges 43 of the electrode fingers are in spaced substantially vertical relation which permits the steam or vapor bubbles forming therebetween to readily escape upwardly into the hollow heater body 22. This body may be provided with a plurality of openings 45 therethrough, which are of adequate size to permit the free escape of steam, but which are not large enough to permit the machine operator coming into accidental contact with the electrodes or other charged portions of the heater element.

I have found it desirable that oxidation of the heater electrodes be reduced to a minimum and to this end I construct the electrodes 23 and 24 of an alloy commonly known as stainless steel or any other equally suitable corrosion-resistant material. Electrodes of this construction resist corrosion and tend to remain in an efficient state throughout long periods of service.

As indicated above, the tool carrying-head 11 is supported on the upright 13 of the frame structure 10 and, as illustrated in Fig. 2, is pivotally connected to the upright by means of a hinge connection 46 so that by vertical swinging movement of the head, a tool, such as the gyratory agitator 47, may be swung to an operating position in the bowl or may be swung upwardly out of the bowl to permit removal of the latter from the supporting base. The hinge connection 46 is preferably so located with respect to the bowl, that when the head 11 is swung upwardly the tool 47 will always clear the bowl irrespective of the position of the tool in its path of gyratory movement. For correctly positioning the tool-carrying head with respect to the base portion 12 when the head has been swung to the tool operating position, I provide the head and pedestal 13 with cooperating abutment portions 48 and 49. These abutment portions are preferably located adjacent the hinge 46 and are arranged to limit the downward movement of the head when the latter is swung in the vertical plane.

As another feature of my invention I provide locking means for releasably retaining the head 11 in the desired tool operating position. This locking means is preferably in the form of a sliding bolt 50, which is arranged on the swinging head so that the inner end of the bolt will enter a recess 51 provided on the pedestal 13 when the head has been swung into the tool operating position, or in other words, to substantially the position bringing the abutment elements 48 and 49 into engagement with each other. The sliding bolt 50 is normally retained in the recess 51 by a coil spring 52, but can be withdrawn from the recess in opposition to the spring by means of the knob 53 when it is desired to swing the head in a direction to lift the tool 47 out of the mixing bowl. The lock provided by the sliding bolt 50 serves to retain the head 11 in the tool operating position so that the reaction from the mixing operation will not cause the head to "bob" up and down. Moreover when the head is locked in the tool operating position the entire machine can be readily lifted by grasping the head whenever it is desirable to move the machine from one position to another.

The tool-carrying head itself may be of varied construction and, in this instance, is constructed so as to embody both an electric driving motor and an arrangement of reduction gear mechanism. As shown in the drawings, the head is preferably constructed and arranged so that when the head is in the normal tool operating position the electric motor 55 will be disposed with its armature shaft 56 in the position for most efficient operation, namely in a substantially horizontal plane. The frame of the electric motor is preferably so formed as to provide at one end thereof a casing for the reduction gearing. One end of the armature shaft 56 extends into this gear casing and is provided with a worm 57 which cooperates with a worm gear 59, the latter being connected to a vertical shaft 60. The shaft 60 is suitably journaled in the gear casing with its upper end accessible from the exterior of the gear casing so that an implement, such as a juice extracting device 60', may be operatively connected with the shaft when such device is applied to the supporting boss 61 of the head.

A second vertical shaft 62 is suitably journaled in the gear casing and at its lower end carries a plate-like member 63 which is disposed in the laterally extending gear casing projection 61'. This second shaft is preferably located with its axis substantially in the vertical plane which includes the axis of the motor shaft 56 so that the projection 61' and the gear casing as a whole may have an external shape conforming to and maintaining the general symmetry of the machine. The plate-like member may be secured to the lower end of the shaft 62 by any suitable means such as the pin 64. A gear 65 is arranged inwardly of the plate member 63 and is connected to the latter, as by suitable screws 66, with portions of the plate member and gear in spaced relation to each other, as shown in Fig. 2. A tool operating spindle 67, to which the agitator 47 is detachably connected, is journaled in the plate member 63 and in the gear 65. A gear 68 is pinned or otherwise secured to the spindle 67 between the gear 65 and the plate member 63 and cooperates with an internal ring gear 69 which is secured to the gear casing. A pinion 70 which is pinned or otherwise secured to the lower end of the shaft 60 meshes with the gear 65 so that when the shaft 60 is driven by the electric motor the gear 65 and the plate member 63 will be rotated with the shaft 62. Such rotation of the plate member 63 carries the spindle 67 in a path around the axis of the shaft 62 and, at the same time, the pinion 68 meshing with the ring gear 69 causes the spindle and the tool 47 carried thereby to be rapidly rotated. It will be noted that in the arrangement just described the spindle 67 is supported by bearings provided on the gear 65 and on the plate member 63, thereby eliminating the need for an extremely long bearing bracket on the plate member 63 as has been used heretofore. When the spindle is journaled in the gear 65, as well as in the plate member 63, adequate support is provided for the spindle and, at the same time, it is possible to materially reduce the over-all height of the machine.

For the purpose of operating an implement requiring greater torque and slower speed than the juice extracting device 60', I provide a gear casing with an auxiliary shaft 72 which is preferably arranged to extend in a horizontal plane with the outer end thereof accessible from the exterior of the casing so that the tool to be driven, such as a food chopper, may be detachably connected therewith. For driving the shaft 72 I provide the same with a gear 73 which cooperates with a worm 74 of the shaft 62.

For manufacturing purposes and for purposes of inspection and repair, I construct the gear casing with a removable cover portion 76 which is retained in place by suitable screws 77. In this instance the cover 76 is provided with a supporting boss 77' for the food chopper and also carries a bearing 78 which supports one end of the auxiliary shaft 72.

As another important feature of my invention I provide means for releasably locking the bowl 15 on the base portion 12 so that the bowl will not be displaced either by the gyratory mixing action of the tool 47, or by the building up of steam pressure in the container 17 beneath the mixing bowl. This bowl retaining means comprises an external lug or projection 80 provided at one side of the bowl for releasable engagement with the supporting rim 14, and means at the other side of the bowl for releasable locking cooperation with a portion of the bowl, such as the external annular bead or rim 81. Such releasable locking means may include an extension 82 on the pedestal 13 and a hold-down portion 83 on the tool-carrying head 11. The extension 82 is arranged on the pedestal at such height that the external bead 81 of the bowl will overlie the extension when the bowl is in operative position, as shown in Fig. 2. The hold-down portion 83 of the tool-carrying head is so constructed and arranged that when the head is swung to bring the tool 47 into operative position in the bowl, the hold-down portion will overlie the top edge of the bowl and cooperate with the extension 82 in releasably locking the bead 81 of the bowl therebetween. The locking means thus provided by the parts 82 and 83 cooperates with the locking lug 80 for retaining the bowl on the support during the very time that the mixing operation is being performed, and when the head is swung to its inoperative position the bowl is thereby released so that it can be readily removed from the support.

If desired, the end of the armature shaft 56 opposite to the end carrying the worm 57 may be provided with an extension 84 which projects outside of the housing of the motor and on which may be mounted a grinding or buffing wheel 85. A removable cover or shield 86 may be disposed around the wheel 85 when the latter is not in use.

As shown in Figs. 1 and 2 of the drawings, the mixing bowl 15 may be provided at opposite sides thereof with suitable handles 87 to facilitate handling of the bowl by the operator. These handles are preferably so constructed and connected to the bowl that the lower ends of the handles provide stops 88 which engage the rim 14 of the bowl support to assist in preventing tipping of the bowl on the support.

In addition to the heater control switch 32, a suitable motor control switch 89 may also be mounted on the pedestal 10 and a suitable current supply connection, such as the extension cord 90, may be operatively connected with the switches for supplying the current required for operating the driving motor and the electric heater.

From the foregoing description and accompanying drawings it should now be readily understood that I have provided an improved food preparing machine of very compact and efficient construction. It will be further seen that this improved machine embodies a novel arrangement of electric heating means and also embodies novel means for releasably locking the bowl on the bowl support, such that when the tool carrying head is swung into the tool operating position the bowl is locked in place, and when the tool is swung to inoperative position the bowl is released for removal from its support. It will also be understood from the foregoing description that I have provided a simplified and improved gearing arrangement for operating the implements at the desired speeds, as well as means for releasably locking the tool-carrying head in the tool operating position. An important feature of the electric heating means of my improved machine resides in the fact that all parts of the electric heater are shielded and protected against accidental contact by the machine operator. Furthermore, the heater itself is constructed in the form of a single compact element which is readily removable from the heating chamber for the purpose of washing or cleaning the electrodes. When the heater unit is thus removed from the heating chamber the electrodes are disconnected from the current supply means so that accidental injury to the machine operator is impossible during such cleaning operation.

While I have illustrated and described the improved food preparing machine of my invention in a detailed manner; it will be understood, however, that I do not intend to be limited to the precise details of construction and arrangements of parts illustrated and described, but regard my invention as including such changes and modifications as do not involve a departure from the spirit of the invention and the scope of the appended claims.

Having thus described my invention, I claim:

1. In food preparing apparatus the combination of a pair of frame members one being a tool-carrying member and the other being a base member provided with a recess adapted to contain liquid, a bowl on said base member providing a container for the food to be prepared, said container having a portion thereof substantially closing said recess, means pivotally connecting said frame members whereby the tool-carrying member may be swung into position for operation of the tool in said bowl to agitate the food in contact with said container portion, and a liquid conductor electric heater in said recess for supplying heat to the liquid for transfer to said container portion.

2. In food preparing apparatus the combination of a pair of frame members one being a tool-carrying member and the other being a base member provided with a recess adapted to contain liquid, a bowl on said base member providing a container for the food to be prepared, said container having a portion thereof substantially closing said recess, means pivotally connecting said frame members whereby the tool carrying member may be swung into position for operation of the tool in said bowl to agitate the food in contact with said container portion, means for retaining the bowl in recess closing position, and a liquid conductor electric heater in said recess for supplying heat to the liquid for transfer to said container portion.

3. In apparatus of the character described the combination of a metal frame structure having an opening therein, a bowl engaging the frame structure and substantially closing said opening, a non-metallic container disposed beneath the bowl and held in substantially fluid tight engagement with said frame structure, and a liquid-conductor electric heater in said non-metallic container.

4. In apparatus of the character described the combination of a metal frame structure having an opening therein, a bowl removably engaging said frame structure and substantially closing said opening, a vitreous dish-like container having the top portion thereof in substantially fluid tight engagement with the frame structure, and a liquid-conductor electric heater in said container.

5. In apparatus of the character described the combination of a metal frame structure having an opening therein, a bowl supporting rim extending around said opening, a bowl removably engaging said rim and substantially closing said opening, a non-metallic container supported in substantially fluid tight engagement with said rim, said container having a recess in the bottom wall thereof, and a liquid-conductor electric heater supported in the container with a portion thereof extending into said recess.

6. In apparatus of the character described the combination of a metal frame structure having an opening therein, a bowl removably supported on the frame structure and substantially closing said opening, a non-metallic container disposed beneath said opening and held in substantially fluid tight engagement with the frame structure, and a readily removable liquid-conductor electric heater in said container.

7. In apparatus of the character described the combination of a metal frame structure having an opening therein, a bowl removably supported on the frame structure and substantially closing said opening, a non-metallic container disposed beneath said opening and held in substantially fluid tight engagement with the frame structure, terminal elements on the inner wall of said container, and a liquid-conductor electric heater in the container, said heater being readily removable from the container and having terminal elements detachably engaging the first mentioned terminal elements.

8. In apparatus of the character described the combination of a metal frame structure having an opening therein, a bowl removably supported on the frame structure and substantially closing said opening, a non-metallic container disposed beneath said opening and held in substantially fluid tight engagement with the frame structure, said container having a recess in the bottom wall thereof, and a liquid-conductor electric heater engaging said bottom wall around the recess therein and having portions extending downwardly into the recess.

9. In a liquid-conductor electric heater the combination of a non-metallic container adapted to contain liquid, and means supporting a pair of electrodes adjacent the bottom of the container, said electrodes being formed with substantially radially extending fingers disposed in spaced interfitting relation.

10. In a liquid-conductor electric heater the combination of a non-metallic container adapted to contain liquid, and means supporting a pair of electrodes adjacent the bottom of the container, said electrodes being formed of sheet metal and having flanged radiating fingers disposed in spaced interfitting relation.

11. In a liquid-conductor electric heater the combination of a non-metallic container adapted to contain liquid, a non-metallic electrode holder removably supported on the bottom of the container, and a pair of electrodes on said holder each comprising a ring portion and an arcuate series of radiating integral fingers, said electrodes being arranged on said holder with their ring portions in substantially coaxial relation and with the radiating fingers in spaced interfitting relation.

12. In a liquid-conductor electric heater the combination of a dished container having a recess in the bottom thereof, a non-metallic electrode holder removably supported in the container and substantially covering said recess, and a pair of electrodes on the holder and removable therewith as a unit, said electrodes having portions in interfitting spaced relation arranged to extend into said recess.

13. In a liquid-conductor electric heater the combination of a dished container having a recess in the bottom thereof, a pair of insulated terminal members extending into said recess, a non-metallic electrode holder removably supported in the container and substantially covering said recess, a pair of terminal members on said holder for detachable engagement with the first mentioned pair of terminal members, and a pair of electrodes on said holder and connected to the respective terminal members of the holder, said electrodes having portions in interfitting spaced relation arranged to extend into said recess, said holder and its terminal members and electrodes being removable from the container as a single unit.

14. In food preparing apparatus the combination of a frame having a recess adapted to contain liquid, a bowl supported on the frame and providing a container for the food to be prepared, said container being disposed with a portion thereof substantially closing said recess, a tool operably supported from said frame and extending into the container for agitating food in contact with said container portion, and an electric heater in said recess for supplying heat to said liquid for transfer to said container portion.

15. In food preparing apparatus the combination of a frame having a recess adapted to contain liquid, a bowl supported on the frame and providing a container for the food to be prepared, said container being disposed with a portion thereof substantially closing said recess, a tool operably supported from said frame and extending into the container for agitating food in contact with said container portion, and an electric heater for vaporizing liquid contained in said recess to thereby cause heat to be supplied to said container portion.

16. In food preparing apparatus the combination of a frame having a recess adapted to contain liquid, a bowl supported on the frame and providing a container for the food to be prepared, said container being disposed with a portion thereof substantially closing said recess, a tool operably supported from said frame and extending into the container for agitating food in contact with said container portion, and an electric heater in said recess for vaporizing liquid contained therein to thereby supply heat to said container portion, said electric heater being automatically rendered inoperative by predetermined lowering of the level of the liquid.

17. In food preparing apparatus the combination of a pair of frame members one being a tool-carrying member and the other being a base member provided with a recess adapted to contain vaporizable liquid, a bowl supported on the base member and providing a container for the food to be prepared, said container being disposed with a portion thereof substantially closing said recess, means connecting said frame members whereby the tool-carrying member may be disposed with the tool extending into the container for agitating food in contact with said container portion, and an electric heater in said recess for vaporizing liquid contained therein and thereby supplying heat to said container portion, said heater being arranged to be submerged in the liquid.

CONRAD B. KRAUSE.